Nov. 24, 1925.
E. FLENTJE
SHOCK ABSORBER
Filed Dec. 29, 1924
1,562,879
2 Sheets-Sheet 1
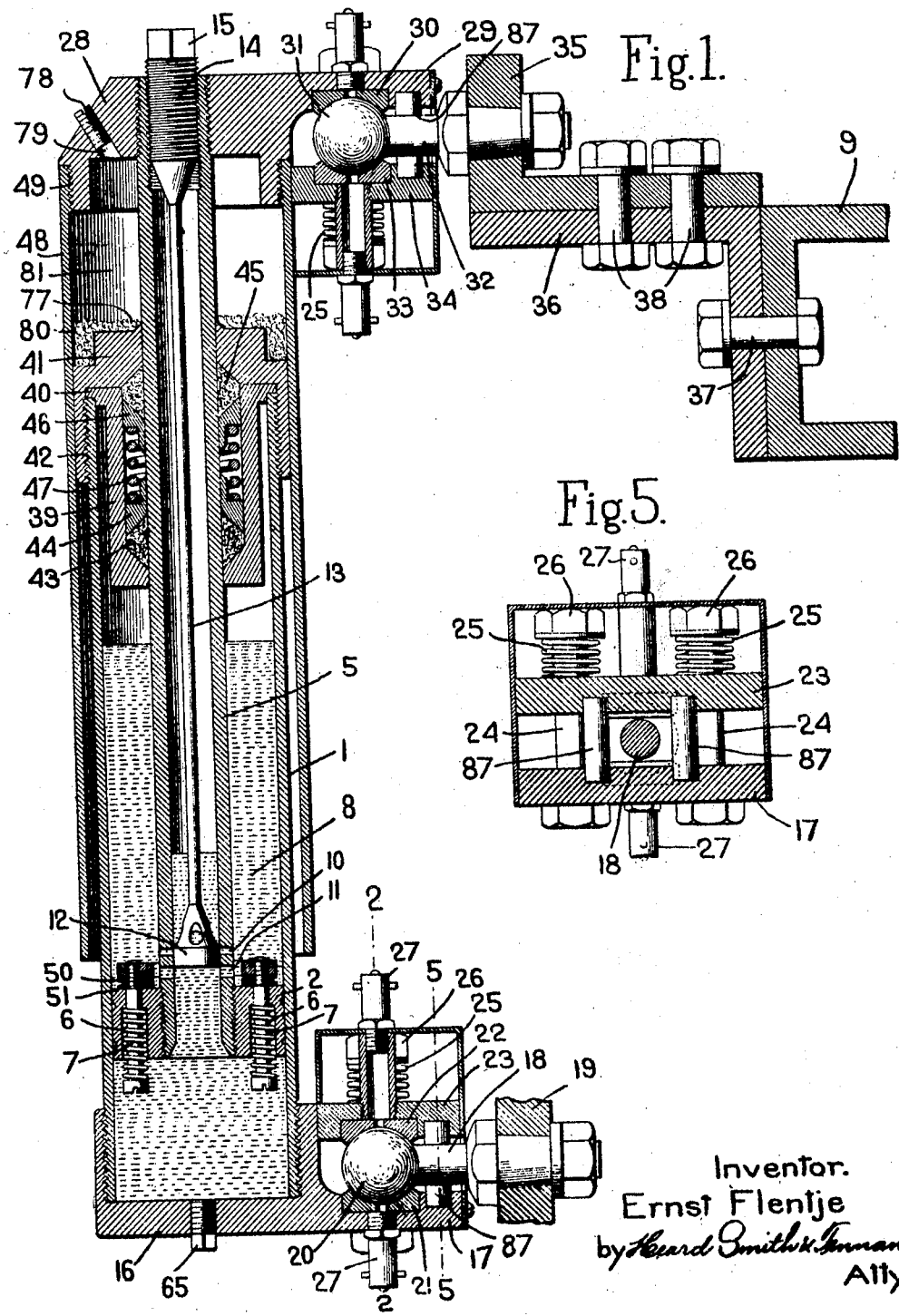
Inventor.
Ernst Flentje
by Heard Smith & Tennant.
Attys.

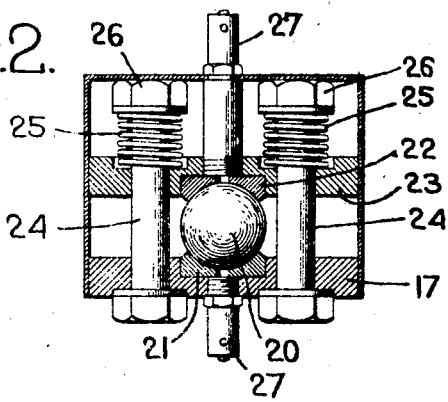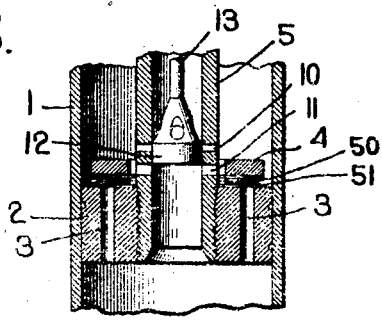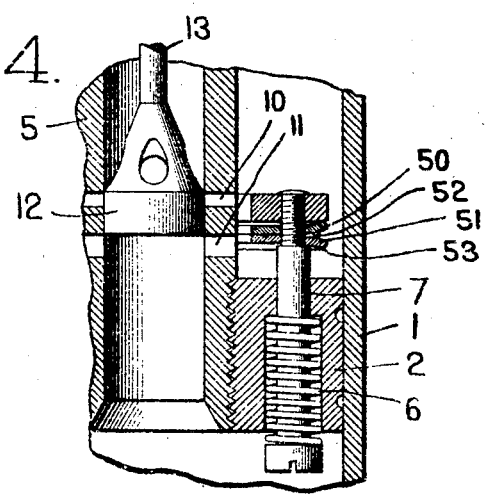

Patented Nov. 24, 1925.

1,562,879

UNITED STATES PATENT OFFICE.

ERNST FLENTJE, OF CAMBRIDGE, MASSACHUSETTS.

SHOCK ABSORBER.

Application filed December 29, 1924. Serial No. 758,637.

*To all whom it may concern:*

Be it known that I, ERNST FLENTJE, a citizen of the United States, and resident of Cambridge, county of Middlesex, State of Massachusetts, have invented an Improvement in Shock Absorbers, of which the following description, in connection with the accompanying drawing, is a specification, like characters on the drawing representing like parts.

This invention relates to shock absorbers such as are used on automobiles to counteract or prevent violent recoil of the springs after they have been compressed, and particularly to shock absorbers of the type including a cylinder secured either to the axle or the chassis, usually the axle, and a valved piston within the cylinder having a piston rod extending through the end of the cylinder and connected to the chassis.

One of the objects of my present invention is to provide an improved shock absorber of this type which has a minimum over-all length and which is, therefore, adapted to be used on low hung cars.

Other objects of the invention are to provide a novel shock absorber of this type in which the retarding action of the piston in the cylinder is secured partly by the use of a liquid in the cylinder and partly by the use of air, to provide a shock absorber with an improved stuffing box for the piston rod and an improved means for enclosing and protecting the portion of the piston rod exterior to the cylinder and otherwise to improve shock absorbers all as will be more fully hereinafter set forth.

In order to give an understanding of the invention I have illustrated in the drawings a selected embodiment thereof which will now be described after which the novel features will be pointed out in the appended claims.

Fig. 1 is a sectional view of a device embodying my invention;

Fig. 2 is a section on the line 2—2, Fig. 1;

Fig. 3 is a fragmentary sectional view taken through the piston at right angles to Fig. 1;

Fig. 4 is an enlarged fragmentary view showing the valve;

Fig. 5 is a sectional view on the line 5—5, Fig. 1.

1 indicates the cylinder of the shock absorber in which operates a piston 2, the latter having a plurality of ports 3 therethrough which are adapted to be closed by a valve 4, herein shown as having an annular shape which surrounds the piston rod 5. The valve is yieldingly held to its seat by means of springs 6 which encircle pins 7 that are secured to the valve and extend through the piston. The cylinder 1 contains some suitable checking fluid 8 such for instance as oil or glycerine and the valve herein shown permits the piston to move downwardly freely but closes when the piston moves upwardly.

The cylinder is connected at its lower end to the axle of the automobile by means which will presently be described, and the piston rod 5 extends through the upper end of the cylinder and is connected to the frame or chassis 9 of the automobile so that as the springs of the automobile flex the piston will move up and down in the cylinder as usual in shock absorbers of this type.

The piston rod 5 is hollow and is provided with by-pass ports 10 and 11 which form a communication between the cylinder space below the piston and that above the piston. These ports are adapted to be controlled as to their area by a piston valve 12 which is adjustable longitudinally of the hollow piston rod and is provided with a stem 13, the end 14 of which extends through the end of the piston rod and has screw-threaded engagement therewith, said end being provided with a wrench-receiving portion 15 for receiving a wrench or other tool for adjusting the valve.

The parts thus far described are or may be all as usual in shock absorbers of this type and it will be understood that when the springs of the automobile flex so that the axle and body move toward each other the piston will be moved downwardly in the cylinder and the valve 4 will open thus allowing a free passage of the checking liquid both through the ports 3 and through the by-pass ports 10 and 11. When the spring begins to recoil, however, and the piston starts to move upwardly the valve 4 will close and the upward movement of the piston is then determined by the rate at which the liquid can flow through the by-pass ports 10 and 11 and the area of these ports may be adjusted to suit the requirements of use.

In manufacturing automobiles there is a present day tendency to build low hung cars and one of the objects of my present invention is to provide a shock absorber of this type which can be used with cars of this class. I secure this object by employing novel means for connecting the piston rod and cylinder to the chassis and axle of the automobile respectively which does not add anything to the over-all length of the device.

The cylinder 1 is provided at its lower end with a head 16 which is shown as screw-threaded thereto and said head is formed with a lateral extension 17 to which is flexibly connected a horizontally-extending stud 18 that is secured in a bracket 19 which in turn is adapted to be secured to the car axle. The stud 18 is provided at its end with a ball 20 and this ball is received between two socketed bearing blocks 21, 22. The bearing block 21 is carried in a seat or recess formed in the lateral extension 17 and the block 22 is carried in a recess formed in a cross head 23. The cross head is connected to the extension 17 by means of two bolts 24 that extend vertically through the cross head and are situated on opposite sides of the ball 20. I will preferably employ springs 25 which encircle the bolts 24 and are situated between the cross head 23 and the heads 26 of the bolts. These springs introduce a yielding element into the connection so that the ball 20 is retained between two seats capable of having a slight yielding movement relative to each other. Provision is made for lubricating this ball bearing by introduction of suitable lubrication through the connections 27.

87 indicate vertically-extending pins which are anchored at their lower ends in recesses in the extension 17 and at their upper ends in recesses in the cross head 23. These pins are situated on opposite sides of the stud 18 and serve to limit the lateral swinging movement of the stud.

A similar construction is employed in the connection between the piston rod and the chassis 9. The upper end of the piston rod has a head 28 secured thereto which is provided with a laterally-extending arm 29, the latter carrying on its under face a socket bearing member 30 that receives the ball end 31 of a laterally-extending stud 32. This ball is confined between the socket member 30 and a similar socket member 33 that is carried by a cross head 34, said cross head being yieldingly connected to the arm 29 by means of bolts 24 and springs 25 similar to those above described with reference to the cross head 23.

The stud 32 is shown as anchored in an angle iron member 35 which in turn is secured to an angle iron bracket 36 that is bolted to the sill 9 of the chassis by a bolt 37. The members 35 and 36 are connected as shown by means of bolts 38. With this construction the brackets and other means for attaching the device to the axle and automobile frame do not extend beyond the ends of the piston and cylinder and thus the total over-all length is no longer than the over-all length of the cylinder and piston rod. This permits the device to be installed on a low hung car without bringing the lower end of the cylinder too near the ground. The ball and socket connection provides a connection which is sufficiently flexible to accommodate any relative movement between the axle and body of an automobile without bringing any unnecessary strain on the parts.

The stuffing box which is used for packing the piston rod is of novel construction. It comprises a cup-shaped member 39 which is set into the upper end of the cylinder and is provided with a flange 40 resting on the end of the cylinder, said member being held in place by the cap 41 which is provided with the screw-threaded flange 42 that is screw-threaded to the cylinder.

43 indicates packing situated in the lower end of the member 39 and 44 is a packing gland which engages this packing and holds it in position. A second packing 45 is located at the upper end of the member 39 and is confined between the head 41 and another packing gland 46 that is also slidably mounted on the piston rod.

47 indicates a spring situated between the two packing glands 46, 44, said spring tending to force the packing glands away from each other and thus to compress both of the packing rings 43 and 45.

With this construction a double packing is provided and both packing rings are automatically maintained tightly compressed about the piston by means of the spring 47.

The shock absorber herein shown embodies a construction by which the portion of the piston rod 5 which extends beyond the cylinder is protected and by which an air cushion is provided which augments the action of the liquid in checking the recoil of the spring.

The head 28 which is secured to the end of the piston rod has a cylinder or sleeve 48 screw-threaded thereto at 49, said sleeve fitting tightly over the flange 42 and the cylinder cap 41. This cylinder 48 is long enough so that it will not be withdrawn from the cap 41 even when the piston is at the upper end of its limit. This cylinder 48 forms with the cap 41 an air chamber 81. The sliding fit between the cylinder 48 and the flange 42 is not an absolutely air tight fit but the fit is so close that the movement of air into and out of the air chamber 81 around the flange 42 is very materially restricted. When, therefore, the piston moves downwardly during the flexing of the spring the air in the chamber 81 is compressed and will slowly escape between the cylinder 48 and the flange 42. The compression of the air, however, introduces a retarding effect on the downward movement of the piston. Similarly, when the spring recoils and the piston moves upwardly a suction will be produced in the chamber 81 and air will seep into said chamber slowly between the walls of the cylinder 48 and the flange 42. A pneumatic element is thus introduced into the shock absorber which co-operates with the liquid to ensure smooth action of the device.

In order to keep the walls of the cylinder 48 lubricated I propose to place in said chamber 81 a quantity of fibrous material 80 such as cotton waste which may be saturated with lubricant and which will furnish sufficient lubrication for lubricating the cylinder walls.

The head 28 is shown as having a filling opening 79 therein which is closed by a plug 78. The purpose of this opening is for introducing lubrication to the chamber as needed.

This cylinder 48 not only provides the pneumatic element above referred to but it also acts as a means for protecting the portion of the piston rod which projects beyond the cylinder and keeping said portion free from dust and dirt.

The cylinder cap is shown as having a bevelled extension 77 which acts to clean the piston rod as it moves downwardly.

In a device of this sort it is desirable that the closing of the valve 4 in the piston should be accomplished without any unnecessary noise. To provide a quietly closing valve I secure to the under side of the latter two disks 50 and 51 of fibre or some similar non-metallic material and I place a wire 52 between the two disks adjacent the peripheries thereof. This wire tends to separate the disks slightly and to bend the outer edge of the lower disk downwardly as shown at 53. When, therefore, the valve seats this lower edge of the non-metallic disk 53 will strike the piston with a slightly yielding or cushioned movement. This cushioned movement together with the non-metallic nature of the washer will provide a substantially noiseless closing valve.

I claim:

1. A shock absorber for automobiles comprising a cylinder, a valved piston therein having a piston rod, said cylinder having at one end a laterally-extending arm, a head secured to the end of the piston rod and provided with a laterally-extending arm, a stud extending horizontally from each arm, each stud having a ball-and-socket connection with its arm, and means for connecting one stud to the chassis of an automobile and the other stud to the axle thereof.

2. A shock absorber comprising a cylinder, a valved piston therein having a piston rod, a cap closing one end of the cylinder and having a laterally-extending arm, a head secured to the end of the piston rod and also having a laterally-extending arm, a horizontal stud having a ball-and-socket connection with each arm, and means for connecting one stud to the axle of the automobile and the other to the chassis thereof.

3. A shock absorber for automobiles comprising a cylinder, a valved piston therein having a piston rod, a cap closing one end of the cylinder and provided with a laterally-extending arm, a head secured to the end of the piston rod and also having a laterally-extending arm, each of said arms being provided with two socket bearing members, a stud having a ball received between each pair of socket members, and means for connecting one stud to the axle and the other to the frame of an automobile.

4. In a shock absorber, the combination with a cylinder, of a valved piston therein having a piston rod, the head of the cylinder through which the piston rod extends having two packing-receiving chambers, packing in each chamber, a packing gland bearing on each packing and a spring interposed between the packing glands and yieldingly holding both of them against the packing.

5. A shock absorber comprising a cylinder, a valved piston therein having a piston rod, a stuffing box for the piston rod, having two separated packing-receiving chambers, packing in each chamber, two packing glands forming the adjacent walls of said packing-receiving chambers and a spring interposed between said glands and holding each yieldingly against the corresponding packing.

6. A shock absorber comprising a cylinder, a valved piston therein having a piston rod, a stuffing box for the piston rod comprising a cup-shaped member set into the end of the cylinder, a cap screw-threaded to the cylinder, a packing ring in the lower end of the cup-shaped member, another packing ring in the cap, two packing rings and a spring interposed between the glands.

7. A shock absorber comprising a cylinder, a valved piston therein having a piston rod, a cap for the cylinder through which the piston rod extends, said cap having a central boss or raised portion, a protecting sleeve secured to the end of the piston rod and slidably fitting the cylinder cap, said sleeve forming with the cap an air chamber that assists in retarding the movement of the piston, and absorbent material containing lubricant between the boss of the cylinder head and the walls of the sleeve, said absorbent material providing lubrication for the sleeve walls.

8. A shock absorber comprising a cylinder, a valved piston therein having a piston rod, a cap for the cylinder through which the piston rod extends, said cap having a central boss or raised portion, a protecting sleeve secured to the end of the piston rod and slidably fitting the cylinder cap, said sleeve forming with the cap an air chamber that assists in retarding the movement of the piston, and absorbent material containing lubricant between the boss of the cylinder head and the walls of the sleeve, said absorbent material providing lubrication for the sleeve walls, said cap having a bevelled extension immediately surrounding the piston rod and which operates as a cleaner for the latter.

In testimony whereof I have signed my name to this specification.

ERNST FLENTJE.